United States Patent Office 3,359,333
Patented Dec. 19, 1967

3,359,333
SEPARATION OF BF$_3$ CATALYST FROM ALKYL PHENOL
Helmuth G. Schneider, Westfield, and Thomas F. O'Connor, Atlantic Highlands, N.J., assignors to Esso Research and Engineering Company, a corporation of Delaware
No Drawing. Continuation of application Ser. No. 190,780, Apr. 27, 1962. This application Aug. 10, 1966, Ser. No. 571,643
4 Claims. (Cl. 260—624)

This application is a continuation of our earlier application, Ser. No. 190,780, filed Apr. 27, 1962, now abandoned.

This invention relates to an improved process for neutralizing an alkylation catalyst which is used predominantly in the alkylation of phenols. It particularly relates to a process whereby boron trifluoride (BF$_3$) catalyst is neutralized.

In conventional processes for preparing alkyl phenols, phenol is alkylated with a source of an alkyl group, usually an olefin dimer, trimer or tetramer, in the presence of an alkylation catalyst such as boron trifluoride. The resulting product is an alkyl phenol wherein the alkyl group has from 4 to 20 carbon atoms, preferably 6 to 18 carbon atoms.

Alkyl phenols are commercially large volume products which have many uses as intermediates. For instance, when treated with ethylene oxide, the products are excellent surfactants. They can be used to form calcium and barium phenates. One of their greatest volume uses is as an additive material after they have been converted to alkyl phenol sulfides which, in turn, are converted into metal phenate sulfides. The crude alkyl phenols must be subjected to various unit processes such as neutralization of the catalyst before the finished alkyl phenol product is obtained.

It is known that after the alkylation reaction when the alkylation product and the alkylation catalyst are in contact with each other, the continued presence of the alkylation catalyst, e.g. BF$_3$, causes subsequent dealkylation and rearrangement as well as color degradation of the alkylation product or alkylate. This deleterious result is avoided conventionally by neutralization of the BF$_3$ catalyst with an aqueous sodium bicarbonate solution. Thus, the alkylation product containing BF$_3$ catalyst is washed with said aqueous sodium bicarbonate solution, the reaction mixture is settled and the subsequent product dried by distillation.

It is desirable in any alkylation process that the technique be versatile enough so that either mono or dialkyl alkylation product can be obtained. Thus it should be possible to control the ratios of the monoalkylate to the dialkylate in the product. On any given occasion it may be desirable to have either high yields of monoalkylate or high yields of dialkylate. It is most often desirable to have high yields of monoalkylate.

In order to obtain high yields of monoalkylate it is necessary that the phenol:olefin molar ratio be adjusted so there is about 0.75 to 5, e.g. 1.0 to 1.7, molar proportions of phenol per molar proportion of olefin. Under these conditions the alkylate reaction product will contain large quantities of unreacted phenol.

In the conventional process of introducing aqueous sodium bicarbonate wash into the reaction mixture, it has been found that considerable unreacted phenol in the product is extracted by the sodium bicarbonate solution and is consequently lost. Moreover, apart from the physical loss of phenol, there are other disadvantages which add to the cost of production. One of these is the problem of pollution caused by the phenol contained in the wash water. Another is that the product (crude alkylate) is wet. This complicates the problem of purification. Additionally, any phenol recovered for the recycle is wet and special handling of the phenol is required before it can be recycled. Also moisture in the phenol or in the product causes corrosion. Finally, moisture affects the selectivity of the alkylation reaction. Thus an advantage of this invention is to accomplish a necessary neutralization of the alkylation catalyst without contaminating the reaction mixture with water.

It has now been discovered and forms the substance of this invention that effective, efficient nutralization of the boron trifluoride catalyst in the presence of large quantities of phenol can be accomplished without loss of phenol and without the presence of contaminating quantities of water. In brief, the process of the invention comprises adding a dry base to the crude alkylate reaction mixture, filtering solids and, subsequently, distilling off the alkylate and phenol. The phenol can be easily separated from the alkylate for subsequent recycle to the feed.

The dry base can be any alkaline earth metal or alkali metal base such as MgCO$_3$, Ca(OH)$_2$, CaCO$_3$, Ca(HCO$_3$)$_2$, Ba(OH)$_2$, NaHCO$_3$, Na$_2$CO$_3$, and the like. Calcium bases particularly calcium hydroxide and mixtures of Ca(OH)$_2$—CaO are preferred since they are very effective when completely anhydrous.

In general, one to ten, e.g. two to six, equivalents of base are added per equivalent of boron trifluoride after the alkylation reaction is completed. The subsequent mixture is agitated at a temperature of from 100 to 200° F. and at atmospheric pressure until the overall color of the reaction mixture changes from red to yellow or brown. This change in color indicates that the neutralization of the boron trifluorides cataylst is complete. The time for this color change to take place is normally about a half hour at the above-described temperatures. It will be understood that the time can vary according to the temperature and other process conditions such as materials, concentrations, and the like.

The product is then filtered to remove the solid boron trifluoride/base, e.g. calcium hydroxide neutralization product. The alkylate which contains phenol is then distilled to obtain the alkylated phenol and free phenol. The latter is dry and is recycled to the alkylation process. The boron trifluoride catalyst is completely neutralized using the base, e.g. calcium hydroxide reaction as described and there is no side reaction between the base, e.g. calcium hydroxide, and alkylate. The product obtained from the base, e.g. calcium hydroxide and boron trifluoride reaction can be easily and completely separated from the alkylate-phenol mixture by filtration or centrifuging. For instance, pressure, vacuum, batch or continuous filtration, can be used. No filter aid is necessary although they can be used if desired. The filtrate temperature is usually that of the Ca(OH)$_2$ treatment.

The alkylation of phenols is well known in the art. Preferably, phenol is alkylated with tripropylene or tetrapropylene utilizing 0.5 to 2.0 wt. percent boron trifluoride catalyst based on the total weight of the reactants at a temperature of from 100 to 200° F. The preferred alkyl phenols contain one alkyl group per molecule. Specific preferred alkyl phenol reaction products include dodecyl phenol, nonyl phenol, tertiary octyl phenol, amyl phenol.

The invention will be further understood by reference to the following examples.

EXAMPLE 1

Three hundred and seventy-six grams of phenol, 540 grams of tetrapropylene, and 6.4 grams of boron trifluoride were mixed together and heated at atmospheric pressure in an alkylation reaction at between 140 and 160° F. At the completion of the alkylation reaction, 40 grams of calcium hydroxide were added to the reaction mixture and the mixture was agitated at a temperature of about 150° F. for about a half hour. The reaction mixture was then filtered to remove the solid reaction product formed from the reaction between the boron trifluoride and calcium hydroxide. In order to ascertain whether the catalyst had been effectively neutralized by the calcium hydroxide treatment, the filtrate was distilled under a pressure of 10 mm. of mercury with the following results.

*Dodecyl phenol*

| At, ° F.: | Percent off |
|---|---|
| 366 | 20 |
| 370 | 30 |
| 370 | 40 |
| 370 | 50 |
| 371 | 60 |
| 374 | 70 |
| 378 | 80 |
| 383 | 85 |
| 420 (stopped) | 90 |

The alkylate product distilled at 10 mm. of Hg pressure without decomposition. If the catalyst had not been neutralized, there would have been substantial decomposition.

A sample of the alkylate after filtration was then ashed. The amount of ash obtained was 0.02 wt. percent on the total product asked. From this it can be seen that because of the very low ash obtained the calcium hydroxide did not react with the alkylated phenol. Moreover, the fact that the quantity of ash formed was so low also demonstrates that none of the reaction product of boron trifluoride and calcium hydroxide was present in the filtrate product.

EXAMPLE 2

An alkylation reaction was conducted identically as described in Example 1 except that 470 grams of phenol, 473 grams of tripropylene, and 6.6 grams of boron trifluoride were used. Forty grams of calcium hydroxide were added to the reaction product as in Example 1 and the resulting product was filtered as in Example 1. The filtered product filtrate was distilled under 10 mm. of mercury pressure and the results obtained were as follows:

*Nonyl phenol alkylate*

| At, ° F.: | Percent off |
|---|---|
| 170 | 5 |
| 194 | 10 |
| 320 | 20 |
| 323 | 30 |
| 323 | 40 |
| 325 | 50 |
| 326 | 60 |
| 328 | 70 |
| 330 | 80 |
| 334 | 85 |
| 344 | 90 |
| 380 | 95 |

Again it was noted that the product distilled at 10 mm. of mercury pressure without decomposition. If the catalyst had not been neutralized then there would have been substantial decomposition.

A separate sample of the crude alkylate after filtration was ashed. The amount of ash obtaind was 0.006 wt. percent. This also demonstrates that the calcium hydroxide did not react with the alkylated phenol. Moreover, it further demonstrates that none of the boron trifluoride reaction product with calcium hydroxide was present in the filtered product since the ash content would have been substantially higher if so.

Although the invention has been described above in its preferred form with a certain degree of particularity, it is to be understood that changes in detail can be resorted to without departing from the spirit and scope of the invention as hereinafter claimed.

What is claimed is:

1. An improved process for separating $BF_3$ catalyst from the alkylation product obtained by alkylating a phenol with an olefin having from about 4 to 20 carbon atoms in the presence of $BF_3$ as a catalyst for the alkylation reaction, which comprises mixing said alkylation product with from 1 to 10 equivalents of a water-free base, per equivalent of $BF_3$ present in said alkylation product, at a temperature in the range of 100 to 200° F. whereby there is obtained a mixture of liquid alkylation product and solid reaction product of dry base and $BF_3$, and thereafter separating said solid reaction product from said liquid alkylation product by filtration, said water-free base being selected from the group consisting of $MgCO_3$, $CaO$, $Ca(OH)_2$, $CaCO_3$, $Ca(HCO_3)$, $Ba(OH)_2$, $NaHCO_3$ and $Na_2CO_3$.

2. Improvement as defined by claim 1 wherein said base is water-free $Ca(OH)_2$.

3. Improvement as defined by claim 1 wherein said alkylation reaction is the reaction of phenol with tripropylene in the presence of 0.5 to 2.0 weight percent of $BF_3$ based on the total weight of the reactants of the alkylation reaction.

4. Improvement as defined by claim 1 wherein said alkylation reaction is the reaction of phenol with tetrapropylene in the presenc of 0.5 to 2.0 weight percent of $BF_3$ based on the total weight of the reactants of the alkylation reaction.

References Cited

UNITED STATES PATENTS

| 2,265,582 | 12/1941 | Stevens et al. | 260—624 |
| 2,622,112 | 12/1952 | Van Battum | 260—671 |
| 2,739,172 | 3/1956 | Peters | 260—624 |

LEON ZITVER, *Primary Examiner.*

W. B. LONE, *Assistant Examiner.*